United States Patent [19]

Fukuda

[11] 4,368,617
[45] Jan. 18, 1983

[54] DEVICE FOR CONTROLLING TIMING OF FUEL SUPPLY FOR STARTING A GAS TURBINE ENGINE

[75] Inventor: Daiki Fukuda, Susono, Japan

[73] Assignee: Toyota Jidosha Kogyo Kabushiki Kaisha, Toyota, Japan

[21] Appl. No.: 253,278

[22] Filed: Apr. 13, 1981

[30] Foreign Application Priority Data

Dec. 24, 1980 [JP] Japan .................. 55-183311

[51] Int. Cl.³ .............................................. F02C 7/26
[52] U.S. Cl. ............................................. 60/39.14 R
[58] Field of Search ................. 60/39.14 R, 39.82 N

[56] References Cited

U.S. PATENT DOCUMENTS 4,321,791  3/1982  Carroll ..................... 60/39.14 R

*Primary Examiner*—Louis J. Casaregola
*Assistant Examiner*—Timothy S. Thorpe
*Attorney, Agent, or Firm*—Oblon, Fisher, Spivak, McClelland & Maier

[57] ABSTRACT

A device for controlling timing of fuel supply for starting a gas turbine engine which has a glow plug as an ignition source for fuel is herein disclosed. The device comprises a temperature sensor mounted on the engine for detecting the initial temperature of the glow plug upon application of electricity to the glow plug and generating a signal for starting the engine, which corresponds to the initial temperature of the glow plug, a means for determining time for preheating the glow plug from starting of application of electricity to the glow plug till starting of the engine by the signal and a means for determining timing for starting fuel supply to a combustion chamber of the engine after starting thereof by the signal.

7 Claims, 10 Drawing Figures

DEVICE FOR CONTROLLING TIMING OF FUEL SUPPLY FOR STARTING A GAS TURBINE ENGINE

BACKGROUND OF THE INVENTION

1. Field of the Invention

The present invention relates to a device for controlling timing of fuel supply to a gas turbine engine for starting of the same.

2. Description of the Prior Art

In a conventional gas turbine engine, an error in ignition for starting the engine exerts remarkably bad influence upon durability of the engine. This is because the error in ignition results in remaining of unburnt fuel within the engine, which causes incomplete partial combustion of the fuel or appearance of hot spots on the inner wall surface of the combustion chamber in the next ignition stroke, leading to damage by heat of materials constituting the engine.

In recent years, various researches have been conducted on making parts of the gas turbine engine requiring heat resisting capacity of ceramics to improve efficiency of the engine by making the same driven at a high temperature, however, it is necessary to prevent any error in ignition for driving such an engine since the ceramic material is breakable by a heat shock although it can make the engine driven at a high temperature.

For improving ignition performance of a gas turbine engine, it is preferable to increase electric discharge capacity of a spark plug or utilize a glow plug which can continuously give ignition energy. The former case is not suitable for vehicles equipped with many electronic parts since there is generated electrically harmful noise while the latter case is regarded as much more suitable for said vehicles since generation of noise is small.

However, there still remain various problems for starting a gas turbine engine in which the flow plug is used.

In general, when the gas turbine engine is to be started, the glow plug is preheated in the first place and after the surface temperature of the glow plug reaches a set degree, the engine is driven by a starter and fuel is supplied to the same and ignited. The time of application of electricity to the glow plug during which the surface temperature thereof reaches the set degree is called preheating time, which varies with the condition of the initial temperature of the glow plug in inverse proportion thereto. However, it has been difficult to directly detect the surface temperature of the glow plug by a temperature sensor since the glow plug is mounted within a combustion chamber of the engine.

The surface temperature of the glow plug is generally raised upon application of electricity to the same, though, when the engine is driven by the starter in the process of temperature rise, it is lowered under the influence of air compressed by the rotor of a compressor. This is because the heat on the surface of the glow plug is absorbed by heat transfer toward the compressed air, and as the engine speed is increased, a great volume of heat is absorbed since the amount of the compressed air is also increased.

Further, the temperature rise characteristic of the glow plug after starting of the engine is changed when there is difference in the initial temperature of the glow plug upon starting of application of electricity to the same. It is considered because the preheating time from the glow plug varies with the initial temperature thereof upon starting of application of electricity and consequently the amount of electric energy applied to the glow plug varies with the temperature, whereby difference is caused in the extent of influence by the compressed air. Thus, if the engine is started by supplying fuel thereto when the speed of the turbine reaches a predetermined point, ignition performance is influenced by the initial temperature of the flow plug to be instable.

SUMMARY OF THE INVENTION

It is an object of the present invention to provide a device for controlling timing of fuel supply for starting a gas turbine engine which will not cause any error in ignition and will further improve ignition performance.

It is another object of the present invention to provide a device for controlling timing of fuel supply for starting a gas turbine engine which can easily detect the initial temperature of a glow plug and start fuel supply when the temperature substantially reaches the highest point.

According to the present invention, there is provided a device for controlling timing of fuel supply for starting a gas turbine engine having a glow plug as an ignition source of fuel which comprises a temperature sensor for detecting the initial temperature of the glow plug upon starting of application of electricity thereto, a means for determining the time for preheating the glow plug from starting of application of electricity till starting of the engine by a signal generated from the temperature sensor and corresponding to the initial temperature of the glow plug and a means for determining timing for starting fuel supply to a combustion chamber of the engine upon starting of the engine by the signal corresponding to the initial temperature, thereby enabling starting of the gas turbine engine when the surface temperature of the glow plug gets substantially the highest point and improving the starting characteristic.

DESCRIPTION OF THE PREFERRED EMBODIMENT

Figure 1:
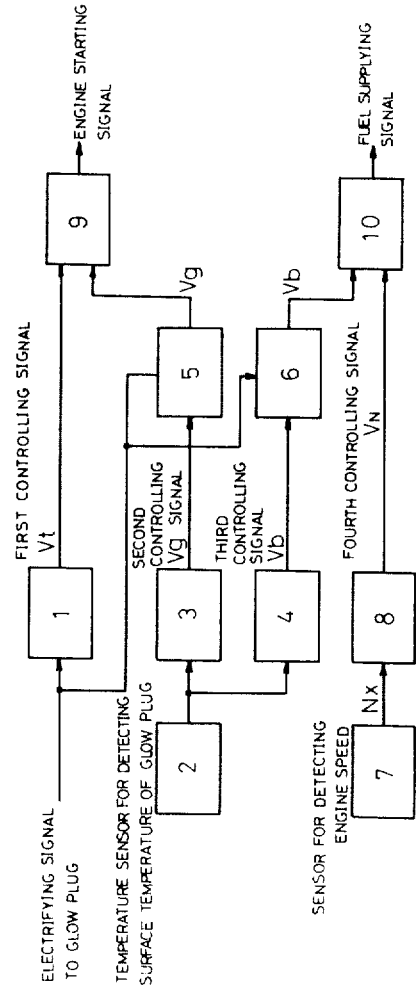
FIG. 1 is a block diagram showing a device according to the present invention.

Referring now to FIG. 1 of the drawings, numeral 1 indicates a first function generator such as an integrated circuit for generating a first controlling signal Vt which is in proportion to the time of application of electricity to a glow plug (not shown) upon input of an electrifying signal to the glow plug. Numeral 2 indicates a temperature sensor for indirectly detecting the surface temperature of the glow plug to generate temperature signals, which are converted into second and third controlling signals Vg and Vb by second and third function generators 3 and 4 such as an operation amplifier and an integrator respectively. The second and third controlling signals Vg and Vb are held by first and second holding circuits 5 and 6 simultaneously with generation of the electrifying signal to the glow plug. Numeral 7 indicates an engine speed sensor such as an electromagnetic pickup for detecting the speed of a gas turbine engine (not shown) to generate a signal $N_X$, which is inputted into a fourth function generator 8 for generating a fourth controlling signal $V_N$. Numeral 9 indicates a first comparator such as an operation amplifier which generates a trigger signal for starting the engine upon input of the first and the second controlling signals Vt and Vg and numeral 10 indicates a second comparator such as an operation amplifier which generates another trigger signal for supplying fuel to the engine upon input of the third and fourth controlling signals Vb and $V_N$.

Figure 2:
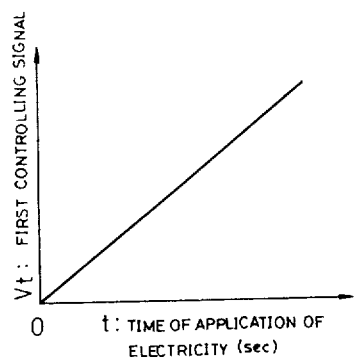
FIG. 2 shows a characteristic diagram of a first function generator.

In operation, the first function generator 1 outputs the first controlling signal Vt as shown in FIG. 2 upon generation of the electrifying signal to the glow plug. The electrifying signal is adapted to start calorification of the glow plug.

Figure 3:
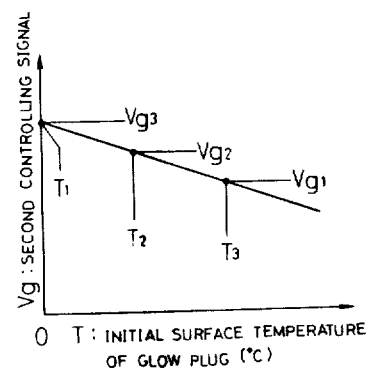
FIG. 3 shows a characteristic diagram of a second function generator.
Figure 4:
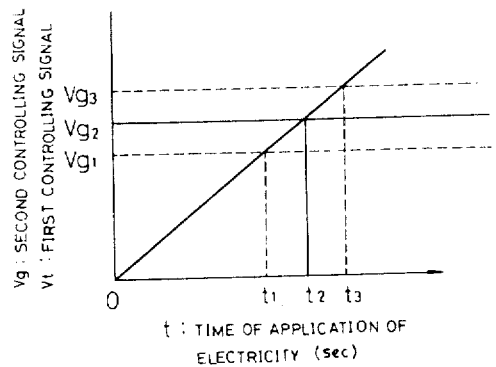
FIG. 4 is an explanatory drawing showing first and second controlling signals inputted into a first comparator with respect to the time of application of electricity to a glow plug.
Figure 7:
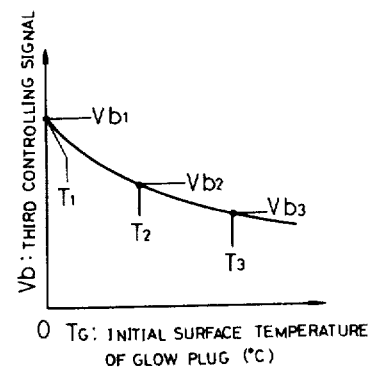
FIG. 7 shows a characteristic diagrm of a third function generator.

The temperature sensor 2 is mounted to, e.g., the inlet of a combustion chamber of the engine so as to detect the temperature of the surface of the glow plug. The output from the temperature sensor 2 is converted through the second and the third function generators 3 and 4 into the second and the third controlling signals Vg and Vb as shown in FIGS. 3 and 7.

The second and the third controlling signals Vg and Vb and the electrifying signal to the glow plug are inputted into the first and the second holding circuits 5 and 6 respectively. In the embodiment of the present invention, the first and the second holding circuits 5 and 6 are adapted to hold the initial controlling signals Vg and Vb from the second and the third function generators 3 and 4 and output the same simultaneously with generation of the electrifying signal to the glow plug. Namely, when the electrifying signal to the glow plug is generated to apply electricity to the glow plug, the first and the second holding circuits 5 and 6 hold the second and the third initial controlling signals Vg and Vb from the second and the third function generators 3 and 4 and output the same which correspond to the initial temperature of the glow plug.

Figure 6:
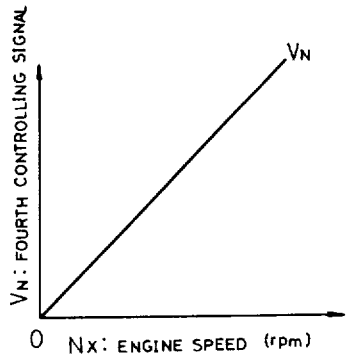
FIG. 6 shows a characteristic diagram of a fourth function generator.

The engine speed sensor 7 is adapted to detect the engine speed by a means such as an electromagnetic pickup. The engine speed signal generated from the sensor 7 is inputted into the fourth function generator 8 to be converted into the controlling signal $V_N$ which is in proportion to the engine speed as shown in FIG. 6.

The first comparator 9 functions to determine the timing of starting of the engine as a principal part of the present invention.

Figure 5:
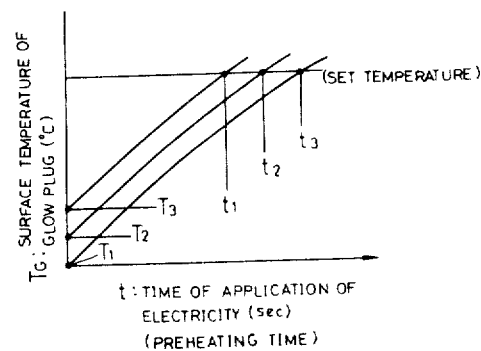
FIG. 5 is an explanatory drawing showing the temperature rise characteristic of the glow plug.

When a glow plug is utilized in a gas turbine engine it should be preheated to a certain temperature previous to starting of the engine. However, the time for preheating the glow plug varies with the initial temperature thereof as shown in FIG. 5. For example, immediately after stoppage of the engine, the temperature of the glow plug is high and consequently the time for preheating the same can be shortened.

Nevertheless, there has been a technical problem in taking of the surface temperature of the glow plug. That is, when the surface temperature of the glow plug mounted within the combustion chamber of the engine is to be directly taken, the temperature sensor is necessarily exposed to high temperature combustion gas, leading to deterioration in durability of the sensor.

To solve such a problem, the glow plug in the present invention is mounted to the inlet of the combustion chamber of the engine so that the initial temperature of the engine only is taken by the same. Since the amount of electrical energy supplied to the glow plug per unit time is constant, the temperature rise coefficient of the glow plug remains constant independently of the initial temperature thereof, and therefore the time for preheating the glow plug to the set temperature is easily calculated to generate a signal for starting the engine.

In the present invention, consequently, there is provided the second function generator 3 which has the output characteristic as shown in FIG. 3 against the initial temperature of the glow plug, and there is further provided the first holding circuit 5 which holds the outputs the voltage Vg as outputted from the second function generator 3.

When the initial surface temperature of the glow plug is indicated by T2 in FIG. 3, the second function generator 3 outputs voltage Vg2 toward the first holding circuit 5. And when the electrifying signal to the glow plug is generated to start calorification of the same, the first holding circuit 5 holds the voltage Vg2 outputted from the second function generator 3 upon generation of the electrifying signal and outputs the same toward the first comparator 3. Therefore, the voltage Vg2 held in the first holding circuit 5 is not changed even by a rise in the temperature of the glow plug.

Upon generation of the electrifying signal to the glow plug, the first function generator 1 outputs the first controlling signal Vt which is increased in proportion to the time t of application of electricity to the glow plug as shown in FIG. 2.

Then the first and the second controlling signals Vt and Vg are inputted into the first comparator 9, and when the signal Vt becomes greater than the voltage Vg, the engine starting signal is outputted from the first comparator 9 to drive the engine.

Figure 10:
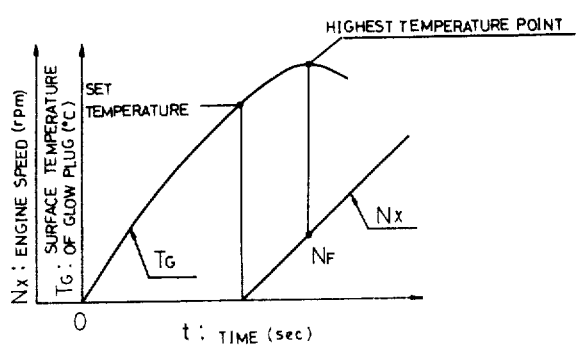
FIG. 10 is an explanatory drawing showing the temperature rise characteristic of the glow plug and the engine speed increase characteristic upon starting of the engine.

The temperature rise characteristic of the glow plug during driving of the engine will now be described. As shown in FIG. 10, generally when the engine is started by a starter after the glow plug is preheated, the surface temperature of the glow plug keeps rising until the engine speed reaches a certain point, and thereafter it is lowered following increase of the engine speed. This is because the surface temperature of the glow plug is influenced by heat transfer toward air which has been compressed by a compressor, and as the engine speed is raised the amount of the compressed air is increased to remarkably influence the surface temperature of the glow plug.

Considering the above characteristics, it is necessary for obtaining good ignition performance in case a glow plug is applied to a gas turbine engine to set the timing for supplying fuel to the engine when the surface temperature of the glow plug gets to the highest point or when the temperature is in the process of rising. In FIG. 10, it is most desirable to supply fuel to the engine when the surface temperature gets the highest point, i.e., at the engine speed as indicated by $N_F$. Namely, fuel ignition can be satisfactorily conducted when the surface temperature of the glow plug is at the highest point by driving the engine after the glow plug is preheated and starting fuel supply to the engine when the engine speed reaches the point $N_F$.

Figure 9:
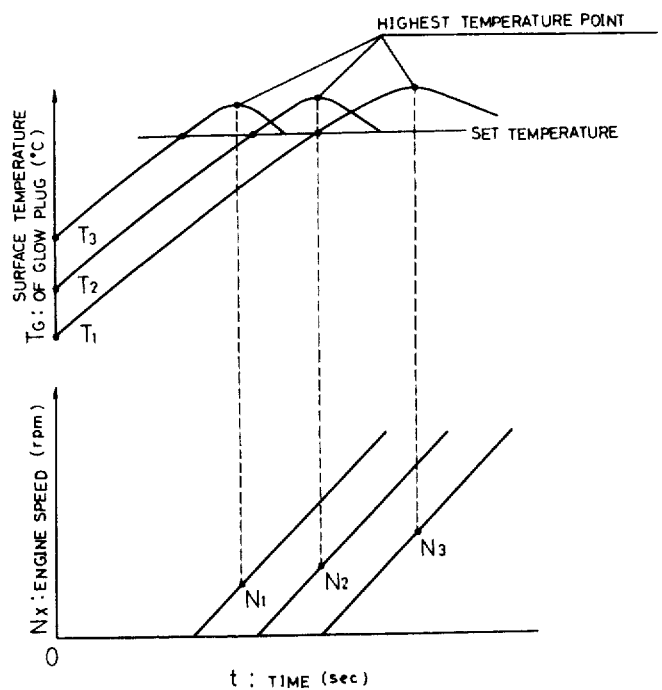
FIG. 9 is an explanatory drawing showing the temperature rise characteristic of the glow plug and the engine speed increase characteristic in case the initial temperatures are different.

However, there is a technical problem for supplying fuel to the engine at the time when the surface temperature of the glow plug becomes the highest. FIG. 9 shows the temperature rise characteristic of the glow plug and the increase characteristic of the engine speed in cases where initial temperature of the glow plug upon application of electricity are different from each other. As hereinabove described, the timing for starting the engine in each case is set when the surface temperature of the glow plug reaches a set point. As is clear from FIG. 9, there are differences in engine speed when the surface temperatures of the glow plug get to the highest points in cases where the initial temperatures upon application of electricity to the glow plug are different. It is considered because when the initial temperatures of the glow plug upon application of electricity thereto are different, there arise differences in preheating time for the glow plug, whereby the amounts of electrical energy inputted into the glow plug differ from each other, leading to differences of influence on the surface of the glow plug by the compressed air. Namely, it is necessary to change the timing for supplying fuel to the engine according to the initial temperature of the glow plug upon application of electricity thereto in case the glow plug is applied to the gas turbine engine, and stable ignition performance cannot be obtained unless the aforesaid change of timing is achieved.

In the present invention, therefore, the initial temperature of the glow plug is set as a variable, and the time for having the glow plug reach the highest temperature is determined by said variable.

The fourth function generator 8 generates the fourth controlling signal $V_N$ which is increased in proportion to the engine speed $N_X$ as shown in FIG. 6 while the engine speed $N_X$ is increased in process of time and may be considered as being in proportion to the time t as shown in FIG. 9.

The third function generator 4 generates the third controlling signal Vb which is successively decreased against increase in surface temperature of the glow plug as shown in FIG. 7. The third controlling signal Vb is held in the second holding circuit 6 simultaneously with generation of the electrifying signal to the glow plug.

Namely, in case the surface temperature of the glow plug is T2° C., the third function generator 4 outputs the controlling signal Vb2 which corresponds to the same, and when the electrifying signal to the glow plug is generated in this condition, the controlling signal Vb2 is held in the second holding circuit 6 and outputted toward the second comparator 10.

The second comparator 10 contains the fourth and the third controlling signals $V_N$ and Vb2, and when the fourth controlling signal $V_N$ becomes greater than the third controlling signal Vb2, the second comparator 10 generates the signal for supplying fuel to the engine.

Figure 8:
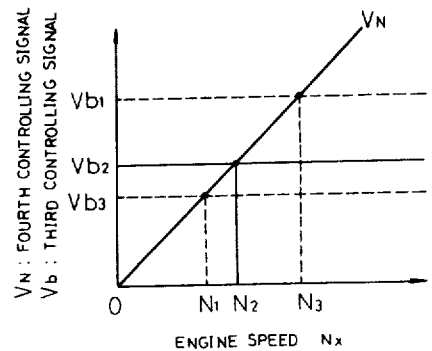
FIG. 8 is an explanatory drawing showing third and fourth controlling signals inputted into a second comparator with respect to the engine speed.

In the present invention, thus, the timing for generating the fuel supply signal is determined by the engine speed so that the fuel supply signal is sent to the engine when the surface temperature of the glow plug gets to the highest point (see FIGS. 8 and 9).

While the invention has been described with reference to a preferred embodiment thereof, it is to be understood that modifications or variations may be easily made without departing from the scope of this invention which is defined by the appended claims.

What is claimed is:

1. A device for controlling timing of fuel; supply for starting a gas turbine engine having a glow plug as an ignition source for fuel, said device comprising:

a temperature sensor mounted on said engine for detecting the initial temperature of said glow plug upon application of electricity to said glow plug and generating a signal for starting said engine, said signal corresponding to said initial temperature of said glow plug;

a means for determining time for preheating said glow plug from starting of said application of electricity to said glow plug till starting of said engine by said signal; and a means for determining timing for starting fuel supply to a combustion chamber of said engine after starting thereof by said signal.

2. The invention as defined in claim 1 wherein said means for determining time for preheating said glow plug from starting of said application of electricity to said glow plug till starting of said engine comprises a first function generator for generating voltage being in proportion to time of application of electricity to said glow plug upon input of an electrifying signal thereto, a second function generator for generating voltage corresponding to said signal from said temperature sensor, a first holding circuit for holding said signal from said second function generator upon generation of said electrifying signal and a first comparator for comparing said voltage held by said first holding circuit and said voltage from said first function generator for outputting a signal for starting said engine.

3. The invention as defined in claim 1 wherein said means for determining timing for starting fuel supply to said combustion chamber of said engine after starting thereof comprises an engine speed sensor for detecting the engine speed, a fourth function generator for generating voltage being in proportion to a signal from said engine speed sensor, a third function generator for generating functional voltage by said signal from said temperature sensor, a second holding circuit for holding said voltage from said third function generator upon generation of said electrifying signal to said glow plug and a second comparator for comparing said voltage held by said second holding circuit and said signal from said fourth function generator for outputting a fuel supply signal to said engine.

4. The invention as defined in claim 2 wherein said first function generator is an integrated circuit.

5. The invention as defined in claim 2 wherein said second function generator comprises an operation amplifier.

6. The invention as defined in claim 3 wherein said engine speed sensor comprises an electromagnetic pickup.

7. The invention as defined in claim 2 or 3 wherein each of said first and second comparators comprises an operation amplifier.

* * * * *